United States Patent [19]

Wittenhorst

[11] 4,233,177
[45] Nov. 11, 1980

[54] PROPELLANT OF REDUCED COMBUSTIBILITY

[75] Inventor: Augustinus J. M. Wittenhorst, Westerburg, Fed. Rep. of Germany

[73] Assignee: Von Treu AG, Switzerland

[21] Appl. No.: 929,199

[22] Filed: Jul. 28, 1978

[30] Foreign Application Priority Data

Jul. 30, 1977 [DE] Fed. Rep. of Germany ....... 2734490

[51] Int. Cl.$^3$ ............................................. E09K 3/30
[52] U.S. Cl. .................................... 252/305; 252/8.1; 424/45; 424/47
[58] Field of Search ..................... 252/305; 424/45, 47

[56] References Cited

U.S. PATENT DOCUMENTS

| | | | |
|---|---|---|---|
| 3,102,101 | 8/1963 | Hawley et al. | 252/305 |
| 3,776,873 | 12/1973 | Kremer | 260/29.1 R |
| 3,822,145 | 7/1974 | Liebowitz et al. | 252/305 X |
| 3,884,828 | 5/1975 | Butler | 252/305 |
| 4,017,418 | 4/1977 | Crompton et al. | 252/309 |
| 4,111,827 | 9/1978 | Thompson et al. | 252/305 X |

FOREIGN PATENT DOCUMENTS

| | | | |
|---|---|---|---|
| 1964794 | 7/1971 | Fed. Rep. of Germany | 424/47 |
| 2300709 | 7/1973 | Fed. Rep. of Germany | 252/305 |
| 2423057 | 11/1974 | Fed. Rep. of Germany | 424/47 |
| 2741882 | 3/1978 | Fed. Rep. of Germany | 424/47 |
| 1476117 | 6/1977 | United Kingdom | 424/47 |

OTHER PUBLICATIONS

Fieser et al.: Organic Chemistry, D. C. Heath and Co., Boston, 1944. p. 149.
Aerosol Age, May, 1963, p. 30.
Beilsteins Handbuch Der Organischen Chemie, 4th Edition, vol. EIVI (1972), p. 37.

Primary Examiner—Richard D. Lovering
Attorney, Agent, or Firm—Cushman, Darby & Cushman

[57] ABSTRACT

There is provided a propellant of reduced combustibility for aerosols comprising at least one liquified hydrocarbon of the group of propane, butane and isobutane and containing in all 2 to 20 weight % of at least one hydrocarbon of the group of dichloromethane and 1,1,1-trichloroethane. There can also be added various inert or flame retarding materials. There is further disclosed a process for preparing the propellant and an apparatus for carrying out the process.

5 Claims, 1 Drawing Figure

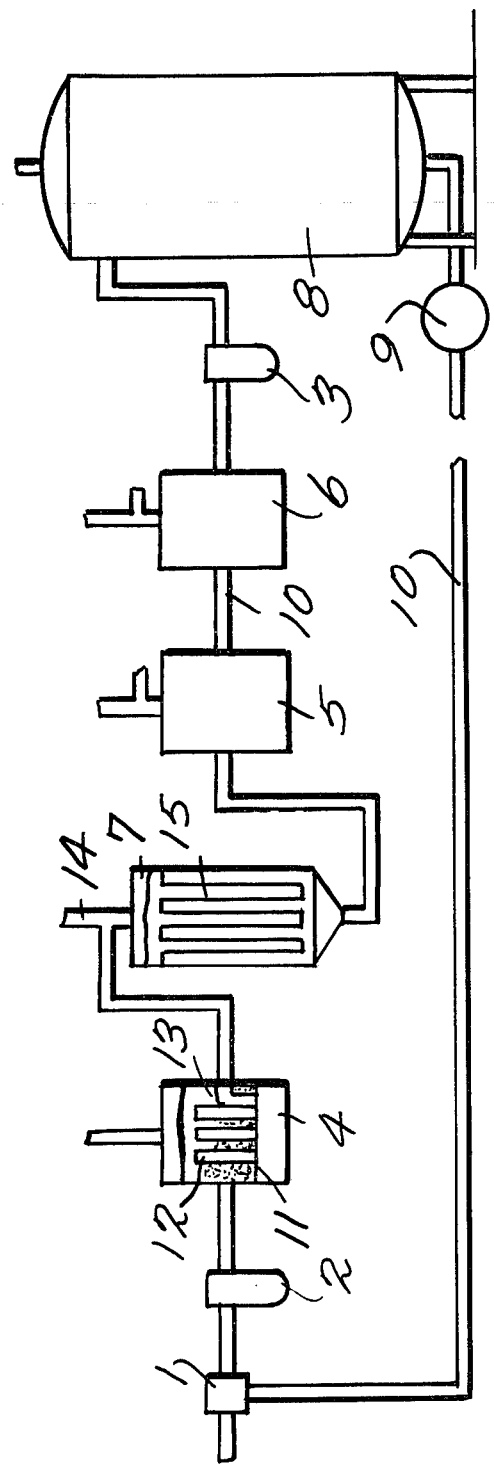

PROPELLANT OF REDUCED COMBUSTIBILITY

BACKGROUND OF THE INVENTION

The invention is directed to a propellant of reduced combustibility for aerosols, a process for producing it and an apparatus for carrying out the process.

There are known as propellants of reduced combustibility for aerosols fluoro-chloro-hydrocarbon gases which until now have been used to a great extent and even still are in use. However, it appears that their use is not completely unobjectionable since at least there exists the possibility that with a persistent and large discharge into the earth's atmosphere there takes place an attack on the ozone belt surrounding the earth. This is significant in the absorption of UV rays. Thus different concerned agencies have even considered forbidding the use of this type of propellant for aerosols.

It is also known to use untreated hydrocarbons as propellants for aerosols. However, since these above all are readily combustible there use is problematical. Of course it is also known to reduce the combustibility of hydrocarbons which are to be used as propellants by addition of materials less susceptible to oxidation, e.g. by addition of nitrous oxide, yet with this alone there have not been produced satisfactory results.

It is even known to reduce the combustibility (flammability) of hydrocarbons by adding water. However, this has the disadvantage that water at the same time acts as a disturbing ballast material, since it practically does not volatilize and cannot assist the propellant in its true function. Instead it is much more likely to favor a phase separation which naturally is undesired. Finally the addition of water in tinplate promotes the corrosion of the same.

It is known from British Pat. No. 1,476,117 to use as propellant for aerosol deodorants, for example a mixture of $C_3$–$C_4$ hydrocarbons and methylene chloride. However, there are no statements in regard to the percentage composition of this type of mixture and of its flammability.

It is now the object of the invention to propose a propellant with reduced flammability which on the one hand is not feared as attacking the ozone belt in the suspected manner and on the other hand is reduced in its flammability in a comparable manner with fluoro-chloro-hydrocarbon gases without being mentionably damaged in its propellant action. Furthermore, the invention should provide a process for production of such a propellant as well as an apparatus for carrying out the process.

SUMMARY OF THE INVENTION

The problem is solved according to the invention by employing as a propellant which has a base at least one liquified hydrocarbon of the group of propane, butane and isobutane and a content in all of 2 to 20 weight % of at least one chlorohydrocarbon of the group of dichloromethane and 1,1,1-trichloroethane.

It is surprising that by addition of such smaller amounts of chlorohydrocarbon the combustibility of the hydrocarbons is greatly reduced or can even be completely eliminated.

The content of methylene chloride and/or 1,1,1-trichloroethane is also adjusted according to the desired pressure since each material contributes to the pressure build up. A propellant of such composition has a good propellant action, and also is barely combustible to incombustible and even is poorly suited to attack the ozone belt in the suspected manner. Thus the greater density compared to air of itself acts against a rise in the earth's atmosphere. A further advantage consists of the good miscibility with almost all active materials or combination of active materials so that no phase separation can be observed and a good dosage with fine spraying and atomizing is guaranteed.

Suitably the hydrocarbons consist of purified propane and/or butane. This type of propellant has the further advantage that it has no significant odor. As purified is to be understood that the hydrocarbon still contains only a little sulfur, especially only a little odor building organic sulfur compounds such as mercaptans.

The amounts of the following stated additives in each case are based on the total weight of hydrocarbon and chlorohydrocarbon.

Advantageously the propellant contains an addition of 0.5 to 10 weight % of carbon dioxide and/or nitrous oxide and/or noble gas.

Through this the combustibility is further reduced and allows the production of various pressures in a particularly simple manner. At 20° C. these reach about 2.5 bar which is common for glass containers and up to 4.5 bar chiefly for tin cans. As noble gases there can be used argon, neon, helium, krypton and xenon.

According to an additional proposal there is provided for an addition of 0.1 to 5 weight % of bromopropane or bromobutane, e.g. 1-bromopropane or 1-bromobutane, or analogous halogen containing materials.

Suitably there is also added a total of 0.1 to 5 weight % of an inorganic and/or organic phosphoric acid compound or boric acid compound.

According to another proposal there is provided an addition of a total of 0.1 to 5 weight % of antimony pentoxide.

The process of the invention is characterized by hydrocarbons of industrial degree of purity liquified under pressure are first coarse filtered for separation of particularly oily impurities and subsequently are fine filtered to separate particularly odor forming impurities wherein dichloromethane and/or 1,1,1-trichloroethane are simultaneously fed in and mixed with the hydrocarbons, and subsequently the mixture trickled in, filtered and again collected.

The particular advantages of the process are that only a few relatively simple process steps are required and an increase in output is possible simply by a repeated carrying out of the process (recycling) whereby the necessary expense for carrying out the process can be held relatively low.

Advantageously carbon dioxide and/or nitrous oxide and/or noble gas are dissolved in the mixture under pressure.

Suitably the mixture is further fine filtered whereby simultaneously further amounts of dichloromethane and/or 1,1,1-trichloroethane are fed in and mixed with the previous mixture.

In another form of the invention the mixture is led over or through further materials to enrich it with the same. Such further materials include especially bromopropane and/or bromobutane, an inorganic and/or organic phosphoric acid compound, boric acid compound or antimony pentoxide.

Suitably the mixture finally obtained is recycled and the hydrocarbons further treated as previously.

The pressure employed advantageously is between 2 and 10 bar and the time for running the hydrocarbons or the mixtures through the total steps of the process is at least 2 hours.

BRIEF DESCRIPTION OF THE APPARATUS

The single FIGURE of the drawing is a schematic illustration of the apparatus for carrying out the mixing and purification.

The apparatus of the invention for carrying out the process is characterized by providing in the direction of flow in succession a feeding device, a coarse filter, a fine filter, a gas sterilizing filter, two further fine filters and a pressure container with a pump arranged on the outflow side and which are joined together over a pressure line, wherein the fine filter inlet is provided with a relief pressure valve for dichloromethane or the like and the gas sterilizing filter is provided with an inlet connection for carbon dioxide or the like.

The advantages of this apparatus are in its easily seen construction from simple components of low ability to create problems.

It is advantageous if the coarse filter is a filtering candle and has a transparent outer housing.

The fine filter suitably consists of a filtering kettle with a separatory wall spaced at a distance from the bottom of the kettle and arranged thereon filter candles opening away from the bottom of the kettle wherein there is contained in the space between the filter candles a ballast or filling of activated carbon, kieselguhr (diatomaceous earth), cellulose, asbestos, glass fibers or silica gel or mixtures thereof.

It is advantageous if the gas sterilizing filter contains an insert with several ceramic filter candles of small pore size, preferably with an ability to retain solid particles greater than 5 microns.

The process can comprise, consist essentially of or consist of the steps set forth, the composition can comprise, consist essentially of or consist of the materials set forth, and the apparatus can comprise, consists essentially of or consist of the elements set forth.

Unless otherwise indicated all parts and percentages are by weight.

DESCRIPTION OF THE PREFERRED EMBODIMENTS

Example 1

The combustibility of a propellant of the invention having the following composition was investigated.

| Butane | 85 weight % |
|---|---|
| Carbon dioxide | 2 weight % |
| Dichloromethane | 13 weight % |

If this type of propellant were used for aerosols and the spray jet directed to a pilot flame, the flame could be brought to extinction. A reaction could not be observed even with a small amount of alcoholic solvent for the active material or combination of active materials of the aerosols.

Example 2

The same results were found with a propellant of the following composition.

| Butane | 85 weight % |
|---|---|
| Carbon dioxide | 1 weight % |
| Argon | 1 weight % |
| Dichloromethane | 13 weight % |

Example 3

Another propellant according to the invention had the following composition.

| Propane/butane (a mixture of equal parts by weight) | 88 weight % |
|---|---|
| Carbon dioxide | 1 weight % |
| Dichloromethane/1,1,1-trichloroethane (a mixture of equal parts by weight) | 11 weight % |

In using such a propellant if the spray jet of an aerosol were directed against the flame of a Bunsen burner the flame would be deflected. There resulted no reaction of the flame; on the contrary the flame burned visibly weaker than previously. Also this result is evidence of reduced combustibility. As a practical matter the propellant is incombustible.

The process will be described in connection with the apparatus which is illustrated in a preferred form in the drawings. The single FIGURE shows the device schematically as well as the structure of the essential components.

The apparatus comprises individually a feeding apparatus 1, two coarse filters 2 and 3, three fine filters 4, 5 and 6, a gas sterilizing filter 7, a pressure vessel 8, a feed pump 9 and a pressure line 10 connecting the previously named component including a return section 10 from the feed pump 9 to the feeding apparatus 1 for recycling.

The coarse filters 2 and 3 are filter candles with a clear outer housing. The coarse filter 2 has the primary purpose of separating oily impurities from the hydrocarbons whereby the coarse filter 3 is additionally arranged merely for safety. However, the latter also makes possible simultaneously a separate visual control.

The fine filters 4, 5 and 6 above the top have inlets for dichloromethane or the like as well as pressure relief valves. The inlets come from metering pumps (not shown). As can be seen for example from fine filter 4 shown partially in section, the fine filter consists of a filter kettle with a separatory wall 11 spaced at a distance from the bottom of the kettle on which separatory wall there are arranged filter candles 12 opening away from the kettle bottom. Between the filter candles 12 there is located a filling 13. In the case of the fine filters, 4 and 5. This consists of activated carbon, kieselguhr, cellulose, asbestos, glass fibers or silica gel or mixtures thereof; in the case of the fine filter 6 this consists of materials with which the treated mixture of hydrocarbons and dichloromethane or the like should be enriched.

The gas sterilization filter 7 over the top has an inlet connection 14 for carbon dioxide, nitrous oxide or a noble gas. It contains according to the drawing (partially in cross-section) filter candles 15 which are made of ceramic and retain solid particles greater than 5 microns. The thus purified mixture collects in a funnel shaped outlet at the bottom of the gas sterilization filter 7. The mixture is delivered over the top whereby among other things it is trickled in simultaneously with inblowing, gaseous additives.

The feed (or booster) pump 9 is located on the outlet side of the pressure vessel 8 and makes possible to recycle through the individual process steps the mixture flowing from the pressure container 8 via the return section of the pressure line 8. Besides on the feeding apparatus 1 there are connected various supply containers for liquid hydrocarbons which, however, are only indicated schematically.

The process can be carried out as follows with the apparatus. First liquid hydrocarbons are fed via the feeding apparatus into the pressure line under 2 to 10 bar pressure. After passing through the first coarse filter the hydrocarbons in the first fine filter come into contact with dichloromethane or the like. There occurs there a purification of the hydrocarbons with simultaneous mixing with the dichloromethane. In the connected gas sterilization filter the mixing and purification continue, whereby this process is assisted by introduction of carbon dioxide or the like. The carbon dioxide remains therein as an inert but volatile constituent in the mixture of hydrocarbons, dichloromethane, etc. In the further fine filter the mixture is enriched again with dichloromethane or the like and purified. In the third fine filter the mixture finally comes in contact with simultaneous further mixing and purification with additional especially flame retarding substances which it is likewise enriched.

For a run from the feeding apparatus to the pressure container there is provided a time interval of at least 2 hours. A recycling of up to six times results in a desired content of dichloromethane or the like of up to 20 weight %.

What is claimed is:

1. A propellant for aerosols free from fluorochlorohydrocarbons and having reduced combustibility having as the predominant component at least one liquified hydrocarbon of the group consisting of propane, isobutane and butane, 2 to 20 weight % of at least one chlorohydrocarbon of the group consisting of dichloromethane and 1,1,1-trichloroethane and 0.5 to 10 weight percent of an inert gas of the group consisting of carbon dioxide, nitrous oxide and noble gases based on the total amount of liquified hydrocarbon and chlorohydrocarbon.

2. The propellant according to claim 1 wherein the hydrocarbon is purified hydrocarbon having insufficient sulfur containing constituents to cause a detectable odor.

3. The propellant of claim 1 consisting essentially of the liquified hydrocarbon, chlorohydrocarbon and inert gas.

4. The propellant of claim 1 containing 0.1 to 5 weight % of a member of the group consisting of bromopropane and bromobutane based on the total amount of liquified hydrocarbon and chlorohydrocarbon.

5. The propellant of claim 1 containing at 1 to 5 weight % of antimony pentoxide based on the total amount of liquified hydrocarbon and chlorohydrocarbon.

* * * * *